US012787941B2

(12) United States Patent
Osthues et al.

(10) Patent No.: US 12,787,941 B2
(45) Date of Patent: Nov. 10, 2026

(54) BALER FOR HARVESTED AGRICULTURAL MATERIAL

(71) Applicant: Maschinenfabrik Bernard Krone GmbH & Co. KG, Spelle (DE)

(72) Inventors: Christian Osthues, Horstel (DE); Daniel Olthoff, Lingen (DE); Felix Kalverkamp, Recklinghausen (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 465 days.

(21) Appl. No.: 18/340,542

(22) Filed: Jun. 23, 2023

(65) Prior Publication Data

US 2024/0074357 A1 Mar. 7, 2024

(30) Foreign Application Priority Data

Jun. 24, 2022 (DE) ......................... 102022115782.2

(51) Int. Cl.
*A01F 15/08* (2006.01)
*A01F 15/07* (2006.01)

(52) U.S. Cl.
CPC ........ *A01F 15/0883* (2013.01); *A01F 15/071* (2013.01); *A01F 2015/0735* (2013.01)

(58) Field of Classification Search
CPC ................ A01F 15/0883; A01F 15/071; A01F 2015/077; A01F 2015/0735
See application file for complete search history.

(56) References Cited

U.S. PATENT DOCUMENTS 8,261,512 B2 9/2012 Gette et al.
2003/0024407 A1 2/2003 Ehrenpfort et al.
2004/0083905 A1 * 5/2004 Viaud .................. A01F 15/071 100/8

(Continued)

FOREIGN PATENT DOCUMENTS

DE 29911916 U1 9/1999
EP 1077025 A1 2/2001

(Continued)

OTHER PUBLICATIONS

European Search Report in EP23181067.2, mailed Mar. 12, 2024, 11 pages.

*Primary Examiner* — Cathleen R Hutchins
(74) *Attorney, Agent, or Firm* — McKee, Voorhees & Sease, PLC

(57) ABSTRACT

A round baler for harvested agricultural material and operation thereof that includes a pressing chamber for pressing a round bale, including a wrapping device for wrapping the pressed round bale with a sheathing material and including a transfer device, forming a transfer segment, via which the pressed round bale can be transferred from the pressing chamber to the wrapping device, and including at least one transfer segment device, which, at least in a first position, forms at least a predominant first part of the transfer segment, wherein the transfer device comprises a transfer drive element to drive the pressed round bale to the wrapping device, is mounted movably relative to the transfer segment device in at least one drive position, in which position the transfer segment device is arranged at least partially between the transfer drive element and a ground contact plane of the round baler.

25 Claims, 9 Drawing Sheets

(56) References Cited

U.S. PATENT DOCUMENTS

| | | | | |
|---|---|---|---|---|
| 2009/0202322 | A1* | 8/2009 | Gette | A01F 15/071 414/24.5 |
| 2009/0282788 | A1* | 11/2009 | McClure | A01F 15/0715 53/587 |
| 2016/0374269 | A1 | 12/2016 | Jones et al. | |
| 2019/0053434 | A1 | 2/2019 | Reijersen Van Buuren | |

FOREIGN PATENT DOCUMENTS

| | | | |
|---|---|---|---|
| EP | 0893053 | B1 | 3/2003 |
| EP | 3143867 | A1 | 3/2017 |
| EP | 3228178 | A1 | 10/2017 |

* cited by examiner

BALER FOR HARVESTED AGRICULTURAL MATERIAL

CROSS REFERENCE TO RELATED APPLICATIONS

This application claims priority under 35 U.S.C. § 119 to German Patent Application DE 10 2022 115 782.2, filed Jun. 24, 2022, which is herein incorporated by reference in its entirety, including without limitation, the specification, claims, and abstract, as well as any figures, tables, appendices, or drawings thereof.

FIELD OF THE INVENTION

The present invention is a round baler for harvested agricultural material. The round baler forms a pressing chamber for pressing a round bale. The round baler, moreover, includes a wrapping device for wrapping the pressed round bale with a sheathing material. The round baler also includes a transfer device.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

A generic round baler is more or less known from DE 602 24 751 T2. The disclosed round baler comprises two ramps as the transfer segment device for transferring the pressed round bales from the pressing chamber to the wrapping device. It has proven to be problematic with generic round balers of this type that during their operation on gradients, the pressed round bale cannot be reliably transferred from the pressing chamber to the wrapping device. In particular, during downward travel, the problem arises that round bales remain in the pressing chamber or on the transfer segment and cannot be transferred to the wrapping device without manual intervention, for which reason operation must be interrupted. On the other hand, during upward travel, the problem arises of an acceleration of the round bale on the transfer segment in such a way that it is transferred beyond the wrapping device.

Therefore, there is a strong need to have a baler that has a reliable transfer of a pressed round bale.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

The invention relates to a round baler for harvested agricultural material. The round baler forms a pressing chamber for pressing a round bale. The round baler, moreover, comprises a wrapping device for wrapping the pressed round bale with a sheathing material. The round baler, moreover, comprises a transfer device. The transfer device is configured to form a transfer segment via which the pressed round bale can be transferred in a transfer direction from the pressing chamber to the wrapping device. The transfer device comprises at least one transfer segment device. At least in a first position, the transfer segment device forms at least a predominant first part of the transfer segment.

The task of the present invention is to further develop the generic round baler of the type described and to provide a method for operating the round baler in such a way that the reliability of the transfer of the pressed round bale is improved.

To solve the task, the transfer device comprises a transfer drive element according to the invention. Relative to the transfer segment device, the transfer drive element is at least partially, in particular completely, movably mounted in the transfer direction in at least one drive position in order to drive the pressed round bale to the wrapping device. In the drive position of the transfer drive element, the transfer segment device is arranged, at least partially, between the transfer drive element and a ground contact plane of the round baler.

The round baler is typically a mobile agricultural machine pulled in operation by a tractor unit in a direction of travel over an agricultural surface and is adapted to pick up hay and/or grass as a harvested material and to form a cylindrical and sheathed round bale from the same harvested material. The round baler may, however, also be configured as a self-propelled agricultural machine. The round baler comprises a chassis with at least two wheels. The ground contact plane is a virtual plane, which plane is contacted by the wheels, and which plane is not intersected by the round baler and extends in the direction of travel. When the round baler is operated on a horizontal agricultural surface, the ground contact plane extends horizontally.

The transfer device is, in particular, configured in such a way that the pressed round bale can roll or slide over the transfer segment from the pressing chamber to the wrapping device, at least in the case of a horizontal arrangement of the ground contact plane, without there being a need for the application of force to the round bale in the transfer direction during this process. The transfer segment is preferably configured in such a way that, during the transfer, the round bale does not experience any significant change in direction. The transfer segment preferably extends at least partially at an incline to the ground contact plane. The transfer segment is, in particular, formed by a plurality of elements of the transfer device or its transfer surfaces facing away from the ground contact plane, which are spaced slightly apart from one another in the transfer direction in such a way that round bales of usual size can be transferred over them in a flowing movement.

The transfer segment device is arranged between the pressing chamber and the wrapping device and preferably comprises at least a share of the elements and/or the transfer surfaces. In the first position, the transfer segment device, in this respect, forms a predominant part of the transfer segment, inasmuch as the part of the transfer segment formed by the transfer segment device constitutes at least half of the length of the entire transfer segment measured in the transfer direction. The first part of the transfer segment is preferably continuous and, depending on the position of the transfer drive element, preferably comprises a transfer segment end that is adjacent to the pressing chamber and/or to the wrapping device.

The preposition "between" is to be understood in particular as meaning that a virtual straight line perpendicular to the ground contact plane intersects both the transfer segment device and the transfer drive element. In the drive position, the transfer drive element is arranged above the transfer segment device and, in particular, above the first part of the transfer segment. Preferably, the transfer drive element is movable both relative to the transfer segment device and relative to a machine chassis of the round baler. The, at least partial, mobility of the transfer drive element in the transfer direction enables the pressed round bale, which is also arranged above the first part during the transfer, to be pushed in the transfer direction. A reliable transfer of the pressed round bale to the wrapping device is ensured by the transfer drive element, even during steep downward travel.

The transfer drive element is configured, in particular, as a rotatable roller, the axis of rotation of which extends transversely to the transfer direction and is movable relative to the transfer segment device. The positions mentioned above and below are, in particular, defined solely by the position of the rotational axis and not by a rotational position of the transfer drive element. Due to the rotatability of the transfer drive element, any influence on a possible rotation of the transferred round bale and, thus, the braking thereof is prevented. In the drive position, the transfer drive element is, in particular, spaced apart from the transfer segment device in such a way that, during operation, the force transmitted to a round bale of usual size is, at least in phases, at least substantially directed in the transfer direction.

Preferably, the transfer drive element is mounted so as to be movable, in particular relative to the transfer segment element, from the drive position towards the first part and/or towards the machine chassis, at least into a pick-up support position in which the transfer drive element forms a second part of the transfer segment. This mounting of the transfer drive element allows it to contribute to the transfer of the round bale even without the need to drive the round bale, whether before or after, by optimizing the transfer distance.

The transfer drive element is preferably mounted in such a way that the second part of the transfer segment is arranged between the pressing chamber and the first part of the transfer segment. In a particularly preferable manner, the transfer drive element in the pick-up support position forms the end of the transfer segment adjacent to the pressing chamber. Due to this arrangement of the second part, the transfer drive element can be used during the transfer of the same round bale, initially for support of the round bale and subsequently in order to drive the round bale over the remaining transfer segment, thus maximizing the effectiveness of the transfer drive element.

In addition to the transfer drive element, the round baler preferably comprises a flap element which cooperates to form the pressing chamber in a pressing position, and which can be moved at least partially towards the transfer device to open the pressing chamber. The flap element is not part of the transfer device. In the pick-up support position, the transfer drive element preferably extends in a spatial section and/or surface section of a longitudinal section which is stationary relative to the pressing chamber and into which the flap element extends when in the pressing position. The transfer drive element can thus not be arranged in the support position when the flap element is (still) arranged in the pressing position. The spatial section is a spatial area, the boundaries of which are notional, and which is occupied by the transfer drive element when in the pick-up support position. In the case of a configuration of the transfer drive element as a roller, the spatial section is, in particular, of a cylindrical shape. In the case of a conventionally configured flap element, this definition of the pick-up support position allows the transfer segment to be configured in such a way that a smooth transition of the pressed round bale from the pressing chamber to the transfer segment is possible and enables the best possible conversion of the potential energy of the round bale when in the pressing chamber into kinetic energy during the transfer. In particular, a movement of the round bale in a direction contrary to the transfer direction against a starter roll is prevented, and which starter roll cooperates to form the pressing chamber.

Particularly preferably, the transfer drive element is movable beyond the pick-up support position to a rest position. In the rest position, the transfer drive element is to be arranged, in particular, below the flap element. From said position, after the opening of the flap element in a conventional configuration thereof, the transfer drive element is to be moved particularly quickly into the pick-up support position. During operation, the movement takes place, in particular, in an automated manner, as a function of a position of the flap element.

As an alternative to the features of the characterizing part of claim 1, the task is also solved by a transfer drive element which is movably mounted in the rest position and in the pick-up support position and not necessarily in the drive position.

Preferably, the transfer drive element is mounted at least partially pivotably movable about a drive pivot axis, from which pivot axis the axis of rotation remains, in particular, at a constant distance. The drive pivot axis is preferably arranged at a right angle to the transfer direction. This mounting keeps the risk of failure of the transfer device low. The drive pivot axis is preferably arranged to be stationary in the first position with respect to the machine chassis and/or the transfer segment device.

In a particularly preferable manner, the drive pivot axis is arranged in an intermediate space between the ground contact plane and a reference plane, in which the transfer segment device is also arranged in the first position. The reference plane is thereby adjacent to the transfer segment device. In particular, the drive pivot axis is arranged between at least one part of the transfer segment or the transfer segment device and the ground contact plane. Due to this arrangement of the drive pivot axis, the transfer drive element can already be moved from the pick-up support position to the drive position with a small pivot angle.

The transfer drive element is preferably movably mounted in a dispensing support position. In the dispensing support position, a transfer drive device, which comprises the transfer drive element and, in particular, is pivotably movable as a whole about the drive pivot axis, forms a further part of the transfer segment. The further part of the transfer segment is arranged between the first part of the transfer segment formed by the transfer segment device and the wrapping device. In particular, the transfer drive element is pivotably movable from the pick-up support position beyond the drive position to the dispensing support position. In the dispensing support position, the transfer drive element itself, or a further part of the transfer drive device, forms the further part of the transfer segment. The further part of the transfer segment is configured, in particular, as an alternative to the second part of the transfer segment.

In particular, the transfer drive element is included by the transfer drive device in such a way that, beyond its optional rotatability about the axis of rotation, it can only be moved together with the other parts of the transfer drive device. With the mobility of the transfer drive element in the dispensing support position and the additional part of the transfer segment that can be reached as a result, the transfer drive element has an additional function that supports the transfer of a round bale. The advantage of the dispensing support position is, in particular, it is still possible to transfer a round bale, which was previously located between the transfer drive element in the drive position and the pressing chamber on the transfer segment and for which the transfer drive element was an obstacle, to the wrapping device.

Preferably, the transfer device comprises at least one actuating device with an actuating element for moving the drive element, at least, into the drive position. Preferably, the actuating device serves to move the transfer drive element into all of its positions. For this purpose, it is further preferred that a movement of the transfer drive element is not possible without a movement of the actuating device. The actuating device is, in particular, a linear actuator, preferably a hydraulic, pneumatic, or electric linear actuator. The actuating device enables the transfer drive element to be moved, as required, in any operating situation.

The actuating device is particularly preferably configured to pivot the transfer drive element by at least 15°, preferably by at least 120°, particularly preferably by at least 160°. This angle is swept, in particular, with a movement from the rest position to the dispensing support position.

This configuration of the actuating device allows all useful positions to be reached, even with a compact arrangement of the drive pivot axis directly below the transfer segment.

In at least one of the positions of the transfer drive element and in the first position of the transfer segment device, the actuating element is at least partially arranged between the transfer segment device and the ground contact plane. An actuating direction in which the actuating element is at least partially movable is, in particular, angled at less than 45° with respect to the ground contact plane. The preposition "between" is to be understood, in particular, in such a way that a virtual straight line perpendicular to the ground contact plane intersects both the transfer segment device and the actuating element. This arrangement of the actuating element allows it to be effectively protected from the round bale, from any constituents of the harvested material, as well as from foreign bodies and thus from failure.

The actuating device preferably comprises a link arrangement that couples the actuating element to the transfer drive element. The link arrangement comprises a first link that is mounted pivotably movable to the actuating element and pivotably movable to the machine chassis of the round baler. The link arrangement, moreover, comprises a second link that is mounted pivotably movable to the first link and pivotably movable to the transfer drive element. Preferably, all pivot axes are arranged parallel to the drive pivot axis. Particularly preferably, the axis, about which the second link is pivotably movable on the first link, corresponds to the axis about which the first link is pivotably movable on the actuating element. The link arrangement allows for a far-reaching pivotal movement of the transfer drive element, with only a short, required travel distance and, thus, a small installation space for the actuating element.

The transfer segment device preferably comprises at least one transfer segment device unit. Preferably, the transfer segment device unit is pivotably movable relative to the machine chassis of the round baler, about a pivot axis for the segment, from a first position, in which it is arranged when the transfer segment device is arranged in its first position, into a second position. Particularly preferably, the transfer segment device unit is arranged in the second position when the transfer segment device is also arranged in a second position. In the second position, the transfer segment device unit can cooperate to form the transfer segment. The pivot direction of the transfer segment device unit from the first position to the second position preferably corresponds to the pivot direction of the transfer drive element from the pick-up support position to the drive position. The pivot axis for the segment is, in particular, arranged at a distance from the drive pivot axis. The pivot axis for the segment, in particular, intersects the transfer segment device unit in its end region, which faces the wrapping device at least in the first position. The transfer segment device can also have a segment, which cooperates to form the transfer segment and is at least partially mounted in a stationary position relative to the machine chassis. The pivotably movable mounting of the transfer segment device unit can, in particular, enable an increase of the downward gradient of the transfer segment and thus further support the transfer of the round bale.

The actuating device preferably comprises a transfer element, by means of which it is configured to move the transfer segment device unit from its first to its second position. This means that the actuating device is configured both to move the transfer drive element or the transfer drive device, as well as also the transfer segment device unit. The transfer element is preferably arranged at the actuating element, at the first or the second link, or at the transfer drive device. The transfer element is particularly preferably a rotatable roller, the axis of rotation of which coincides, in particular, with the pivot axis about which the first link can be pivoted relative to the actuating element. The aforementioned advantages of the movable transfer segment device unit are reliably achieved by the transfer element without the need for a separate actuating device.

The actuating device is preferably configured in such a way that during a movement of the transfer drive element from the pick-up support position to the dispensing support position, the transfer element contacts a transfer mating element of the transfer segment device unit. It particularly preferably contacts the transfer mating element during a movement of the transfer drive element from the pick-up support position to the drive position. In particular, in a contact pick-up position of the transfer drive element, the transfer element contacts the transfer mating element. With further pivoting of the transfer drive element, the transfer element remains in contact with the transfer mating element.

Up until the contact pick-up position, the transfer drive element can be moved from the rest position, in particular, independently of the transfer segment device unit. In this manner, it is ensured that the transfer drive element can be put in contact with the round bale immediately after the round bale has passed over it. The transfer segment device unit, preferably, comprises a support surface spaced apart from the pivot axis for the segment, which support surface is configured in such a way that the transfer segment device unit, at least in its first position and/or when the transfer drive element is arranged in the pick-up support position and/or the rest position, releasably contacts the support surface on a support element of the machine chassis. In particular, the support surface is arranged at an end of the transfer segment device unit facing away from the pivot axis for the segment and/or facing the pressing chamber. The transfer segment device unit is particularly preferably not in contact with the transfer drive element in the pick-up support position. With the pivoting of the transfer drive element beyond the contact pick-up position, the support surface is, in particular, released from the support element. The support surface avoids unnecessary burden on the actuating device by a round bale resting on the transfer segment device unit, the force of gravity of which is instead transferred directly into the machine chassis.

Preferably, the transfer element and/or the transfer mating element are/is shaped in such a way that the movement of the transfer segment device unit from its first position ends in its second position, whereas the transfer drive element is moved from the pick-up support position to the dispensing support position, in particular, into the drive position. The movement then ends in the second position when the transfer segment device unit moves back towards the first position with a further movement of the transfer drive element or remains in the second position. This shaping allows, on the one hand, that the transfer drive element can drive the round bale as far as possible to the wrapping device, and on the other hand, that the transfer segment device unit is not too far away from the pressing chamber. This is advantageous in order to prevent any harvested material, in particular harvested material that is unintentionally escaping from the pressing chamber, from getting under part of the transfer segment device, in particular in the region of the actuating device, which could lead to longer downtimes.

The transfer mating element particularly preferably comprises a transfer contour in a longitudinal section, which comprises a first contour section, in particular a straight contour section, and a second contour section, in particular a straight contour section, which is angled relative to the first contour section. The contour sections are, in particular, angled to each other in such a way that the transfer segment device unit is to be moved into the second position upon contact of the transfer element with the first contour section and remains in the second position or is moved back upon contact of the transfer unit with the second contour section. The aforementioned advantages can thus be achieved by simple means. It is understood that the transfer element and the transfer mating element may alternatively be arranged and/or formed interchangeably with respect to each other.

Preferably, the transfer segment device comprises at least two transfer segment device units. These are respectively spaced apart from and, in particular, arranged next to a longitudinal center plane perpendicular to the ground contact plane and parallel to the transfer direction, which longitudinal center plane extends between the two transfer segment device units. In particular, the transfer segment device units are configured to be identical or mirror-symmetrical to the longitudinal center plane. By separating the two transfer segment device units transversely to the transfer direction, it is achieved that, at least in certain phases, the round bale rests only with lateral sections of its outer surface on the transfer segment device during transfer. This, in turn, leads to smoother and, thus, more efficient sliding or rolling of the round bale towards the wrapping device.

The transfer drive device comprising the transfer drive element and/or the at least one transfer segment device unit preferably comprise/comprises at least one frame element or, in particular, at least one roller element rotatably mounted on the frame element. The transfer drive element is, in particular, configured as a roller element. The roller element enables the round bale to slide in the transfer direction, during which sliding, the potential energy is converted into kinetic energy more expediently than during rolling. An unwrapping of the round bale during transfer from the pressing chamber to the wrapping device can, thereby, generally be avoided. The transfer segment device unit, in particular, comprises a plurality of roller elements mounted between two frame elements. Alternatively, or in addition to the roller elements, the transfer segment device unit preferably comprises a sliding plate extending in the transfer direction. The at least one frame element is preferably exclusively pivotably movable relative to the machine chassis and extends at least substantially radially to the respective pivot axis. Preferably, the pivot axis for the segment is arranged coaxially with an axis of rotation, about which axis of rotation the at least one roller element of the transfer segment device unit is rotatably mounted relative to the frame element included thereby.

Preferably, at least in the pick-up support position of the transfer drive element, the at least one frame element of the transfer drive device is, or, in particular, two frame elements, in a top view, are arranged at least partially between the two transfer segment device units. In the top view, the viewing direction is arranged in particular at a right angle to the ground contact plane. In this arrangement of the frame element or alternatively of the frame elements, the transfer drive device in the dispensing support position is particularly well suited to form the further part of the transfer segment through the frame element or, alternatively, the frame elements. The transfer drive device preferably comprises two further frame elements, between which frame elements, in top view, the transfer segment device units are arranged. The frame elements of the transfer drive device are, in particular, arranged to be stationary and offset in a transverse direction on a cross member of the transfer drive device. At least one crank element is preferably arranged in a stationary manner on the cross member, which crank element is connected to the link arrangement and is arranged offset in the transverse direction with respect to the frame elements. The transfer device comprises, in particular, one actuating device per transfer segment device unit.

A portion of the frame element of the transfer drive device that is spaced apart from the drive pivot axis particularly preferably extends in an elongate manner in a portion direction which, in the dispensing support position of the transfer drive element, is less strongly angled to the ground contact plane than a radial with respect to the drive pivot axis and which radial intersects the portion. The radial and the portion direction are preferably angled to each other by at least 10°, in particular by at least 20°. Overall, the frame element particularly preferably comprises at least two portions angled towards each other or is configured to be S-shaped. The portion preferably extends to the transfer drive element. This configuration of the portion makes it suitable for forming the further part of the transfer segment, without the round bale needing to be significantly redirected when passing from the first part of the transfer segment to the further part of the transfer segment.

An end of the transfer segment device unit facing away from the pivot axis for the segment is preferably formed by a collection element which is arranged between the transfer drive element and the ground contact plane at least in the first position of the transfer segment device and when the transfer drive element is arranged in the pick-up support position. This also applies, in particular, when the transfer drive element is arranged in the rest position. The collection element is preferably stationary or integral with the frame element of the transfer segment device unit. The collection element ensures, in particular in the second position of the transfer segment device unit, that there is no excessive gap between the transfer segment device and the pressing chamber through which larger quantities of harvested material could pass.

The collection element extends, in particular, flat between two frame elements of the transfer segment device unit. A collection surface facing away from the ground contact plane preferably extends at an angle, in longitudinal section, to one of the radials with respect to the pivot axis for the segment, which radial intersects the collection surface, and/ or to the transfer direction. In the second position of the transfer segment device unit, the collection surface extends, in particular, in longitudinal section, in the direction of the starter roller. At least in the first position of the transfer segment device unit, the support surface is preferably arranged between the collection surface and the ground contact plane.

In top view, the transfer drive device preferably comprises at least one step element between the transfer segment device units. The step element preferably comprises two stepping areas angled with respect to each other in longitudinal section, wherein particularly preferably, at least in the rest position of the transfer drive element, a first stepping area extends at least substantially parallel to the ground contact plane and, at least in the dispensing support position of the transfer drive element, a second stepping area extends at least substantially parallel to the ground contact plane. The stepping area is particularly preferably formed by a contoured or smooth metal sheet or by a grate.

The wrapping device preferably comprises a wrapping table forming a wrapping trough for the pressed round bale. The wrapping table preferably comprises a wrapping table frame and at least one rotating element, which element rotates relative to the wrapping table frame during operation, in order to rotate the round bale. The rotation element is in particular, a rotating belt. The wrapping table is movable relative to the machine chassis, in particular, at least substantially in translation. The wrapping table, relative to the machine chassis, is preferably movable on the transfer segment from a wrapping position to a pick-up position. In the wrapping position, in which the wrapping table frame is arranged stationary relative to the machine chassis, the wrapping table is arranged during the wrapping of the pressed round bale with the sheathing material. The wrapping table is located in the pick-up position, while the round bale is being transferred from the transfer device to the wrapping table. The pick-up position is, in particular, an end position beyond which the wrapping table cannot be moved from the wrapping position. In the pick-up position, the wrapping table is preferably arranged closer to the ground contact plane and/or closer to the transfer device than in the wrapping position. Particularly preferably, the wrapping table is configured to be transferable from the pick-up position beyond the wrapping position into a discharge position for discharging the pressed and wrapped round bale from the round baler.

The wrapping device preferably comprises a brake roller element which is rotatably mounted about a brake roller rotational axis that is stationary relative to the wrapping table frame. The brake roller element is arranged, at least in the wrapping position, between the wrapping trough and the transfer device. The brake roller element, in the wrapping position, preferably projects from the wrapping table in the direction contrary to the transfer direction.

The brake roller element serves to brake the round bale that is carried by the transfer device, and that is moved in the transfer direction in the case in which the wrapping table is not (yet) arranged in the pick-up position.

The brake roller element is particularly preferably mounted on the wrapping table frame in such a way that, in the pick-up position of the wrapping table, it is arranged between at least part of the transfer segment device and the ground contact plane. In so doing, it does not impede the usual transfer of the round bale from the transfer segment to the wrapping device. Alternatively, it is conceivable that, in the pick-up position, the brake roller element also cooperates to form the transfer segment.

The task of the invention is further solved by a method for operating a generic round baler or a round baler according to the invention for transferring the pressed round bale from the pressing chamber to the wrapping device. According to the method, in order to brake the round bale, the wrapping table is first moved to a bale braking position and/or held in the bale braking position. The bale braking position corresponds to the wrapping position or is defined such that the wrapping table in the bale braking position is arranged between the wrapping position and the pick-up position. While the wrapping table is arranged or remains in the bale braking position, the flap element of the pressing chamber is opened to discharge the round bale from the pressing chamber to the transfer device. In this respect, the round bale is, in practice, subsequently transferred by means of the transfer device until it comes in contact with a front part of the wrapping table, in particular the brake roller element. The wrapping table is then moved to the pick-up position for the picking up of the pressed round bale, in particular alongside the pressed round bale. The round bale is thereinafter transferred to the wrapping table by gravity or with the aid of the transfer drive element. The wrapping table is subsequently moved into the wrapping position to wrap the round bale. Using this method, it can be prevented in the case of an upward directed travel, that the round bale becomes so fast due to the transfer direction being angled downward to the horizontal, that the round bale rolls or slides beyond the wrapping table without significant configuration changes to the known round baler being necessary.

Preferably, the wrapping table is moved into the pick-up position after a certain period of time has elapsed after the opening of the flap element and/or as a function of an output signal from a bale brake sensor for detecting the round bale being in contact with the wrapping device, in particular with the brake roller element. This prevents that, for example, in the case of a slower transfer of the round bale, the wrapping table is already arranged in the pick-up position when the round bale reaches the wrapping device, this while at the same time achieving a speedy transfer.

Preferably, the bale braking position is set as a function of the size of the round bale. The size is determined in particular by means of a size sensor or taken from a control unit of the round baler. In particular, the bale braking position is set in such a way that the distance of the wrapping table to the transfer device or to the ground contact plane in the bale braking position increases with the size of the round bale. This prevents both a lack of braking effect for large bales and a jamming of small bales between the transfer device and the wrapping device.

Preferably, the sequence of the method depends on the output signal of a bale pick-up sensor for identifying a round bale arranged in the wrapping trough. In particular, the movement of the wrapping table into the wrapping position is only performed in response to said identification. Preferably, the transfer drive element is transferred to the drive position when the wrapping table is arranged in the pick-up position and/or the round bale is not yet identified. Particularly preferably, the transfer drive element is returned to the rest position in response to the identification. This avoids unnecessary delays in the operation of the round baler.

Preferably, the movement of the wrapping table is dependent on an inclination of the round baler. In particular, the time period and/or the bale braking position are determined or are set as a function of the inclination. Other method parameters can also be made as a function of the inclination to improve the method. In this way, the braking effect can be optimized for each situation. In particular, the round baler itself has an inclination sensor for determining the inclination or obtains data representing the inclination from the tractor unit. Inclination means, in particular, an inclination about a horizontal and inclination axis perpendicular to the transfer direction.

The generic round baler, or the round baler according to the invention preferably comprises a control device, which is set up for automatic execution of the method described above. For this purpose, the control device is in particular coupled to the aforementioned sensors and is configured to control the actuating element and/or a wrapping device actuating element for moving the wrapping table. In this way, the advantages of the method described above can be achieved in an automated manner and therefore, with only very low susceptibility to error.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated. Further details and advantages of the invention can be found in the schematic figures described below.

In the drawings.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated. The hereinafter elucidated features may also be an aspect of the invention individually or in combinations other than those shown or described, but always at least in combination with the features of the claims. Where appropriate, functionally equivalent parts are provided with identical reference numbers.

Figure 1:
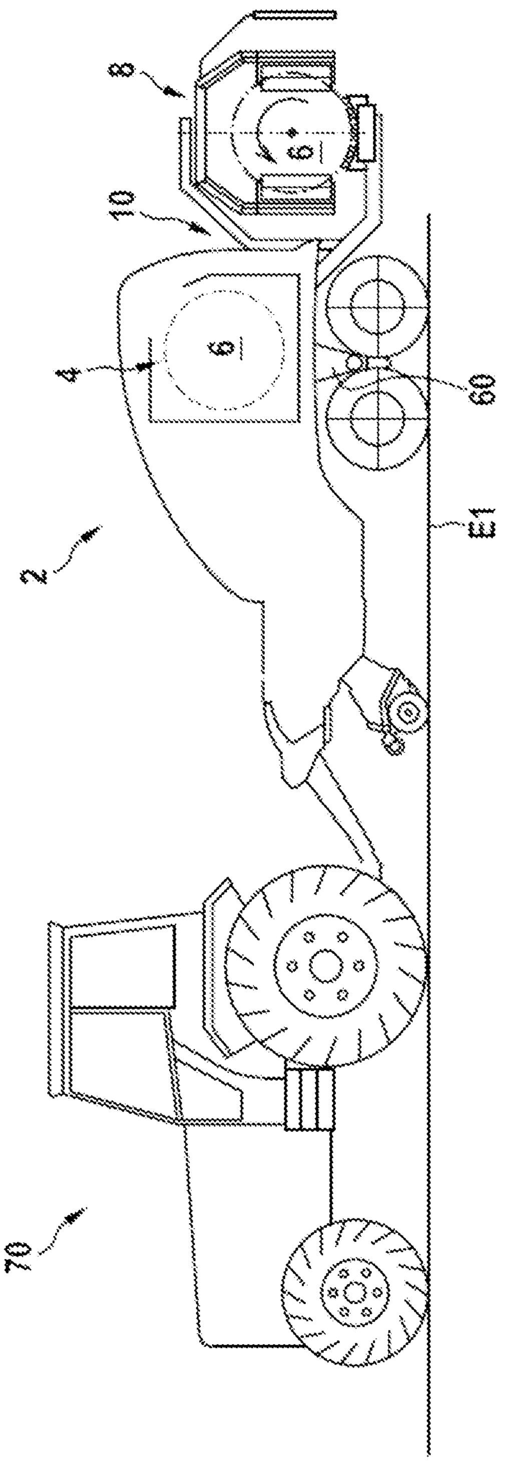
FIG. 1 shows a side view of a round baler according to the invention and which is coupled to a tractor unit.

The round baler 2, according to the invention, is used for pressing agricultural harvested material into round bales 6. In operation, the round baler 2 is pulled by a tractor unit 70 (FIG. 1). The round baler 2 comprises a pressing chamber 4 for pressing the round bale 6. The round baler 2 moreover comprises a wrapping device 8 for wrapping the pressed round bale 6 with a sheathing material. Furthermore, the round baler 2 comprises a transfer device 10 between the pressing chamber 4 and the wrapping device 8.

FIG. 2 through FIG. 12 show longitudinal sections of at least the transfer device 10 and the wrapping device 8 of the round baler 2. FIG. 2 through FIG. 8 document a first method to be carried out with the round baler 2 for transferring the round bale 6. FIG. 9 through FIG. 12 document a further method to be carried out with the round baler 2 for transferring the round bale 6.

Figure 3:
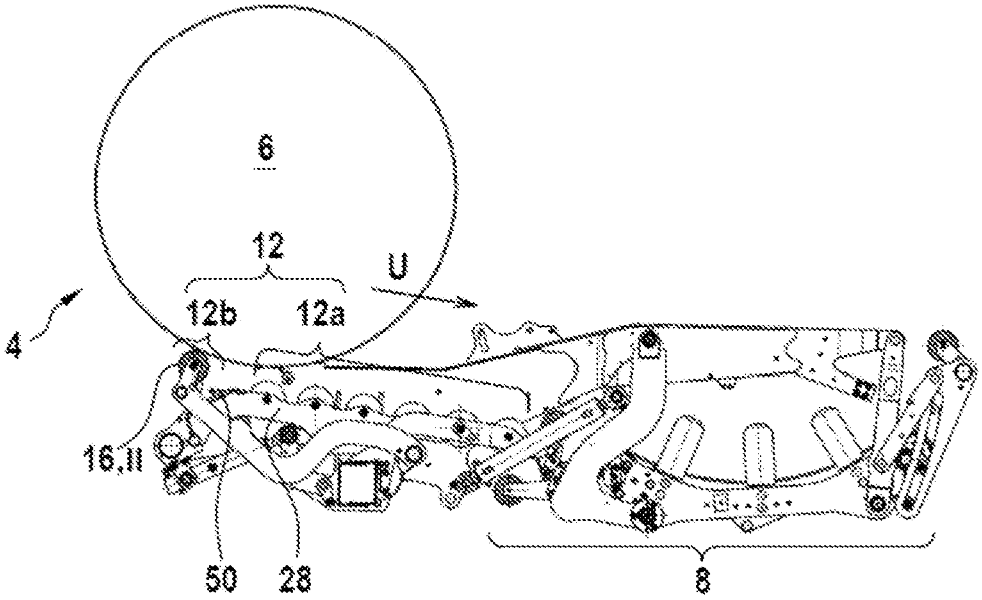
FIG. 3 shows the longitudinal section according to FIG. 2, without showing a flap element, with the transfer drive element in a pick-up support position II.
Figure 7:
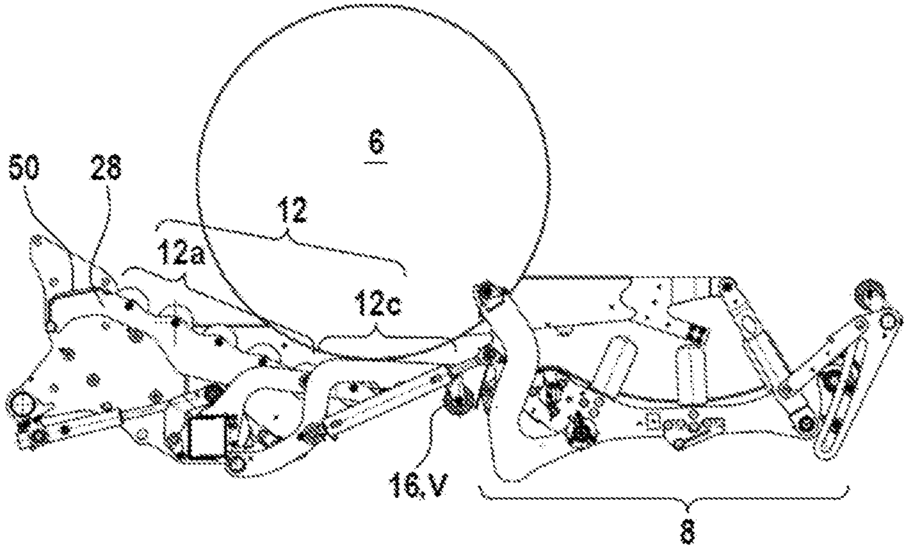
FIG. 7 shows the longitudinal section according to FIG. 3, with the transfer drive element in a dispensing support position V.

The transfer device 10 is configured to form a transfer segment 12, of which transfer segment at least a first part **12*a* is formed by a transfer segment device 14 of the transfer device 10 (FIG. 3 and FIG. 7). The pressed round bale 6 can be transferred by means of the transfer segment 12, in a transfer direction U, from the pressing chamber 4 to the wrapping device 8**.

Figure 14:
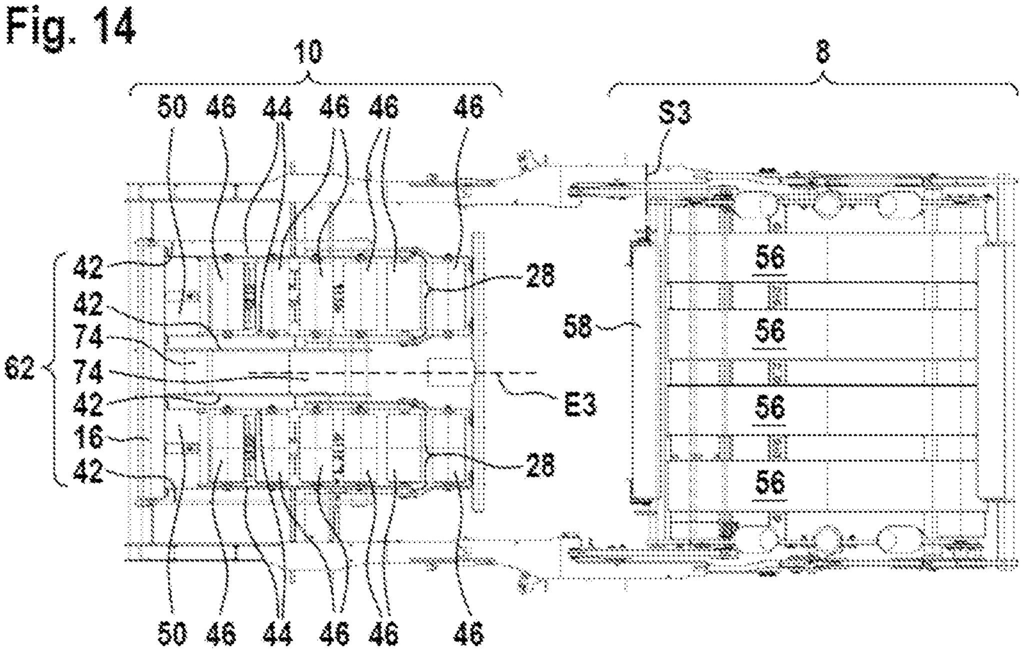
FIG. 14 shows a partial top view of the round baler according to the invention.

The transfer segment device 14 comprises twelve roller elements 46, which are arranged in two groups of six roller elements 46 each (FIG. 14). Four of the roller elements 46 of each group are comprised by a transfer segment device unit 28, which unit also comprises two frame elements 44. The two transfer segment device units 28 are pivotably movable from a first position i (amongst others FIG. 4) about a pivot axis S2 for the segment to a second position ii (amongst others FIG. 5).

In addition, the transfer device 10 comprises a transfer drive device 62 comprising a transfer drive element 16 and four frame elements 42. The transfer drive device 62 is mounted in a pivotably movable manner about a drive pivot axis S1. The drive pivot axis S1 is arranged between a ground contact plane E1 (FIG. 1) and a reference plane E2 (FIG. 2) that is parallel to the ground contact plane E1 and adjacent to the transfer segment device 14, wherein the transfer segment device 14 is arranged between the ground contact plane E1 and the reference plane E2. Both pivot axes S1, S2 are arranged in a stationary manner to a machine chassis 60.

Figure 2:
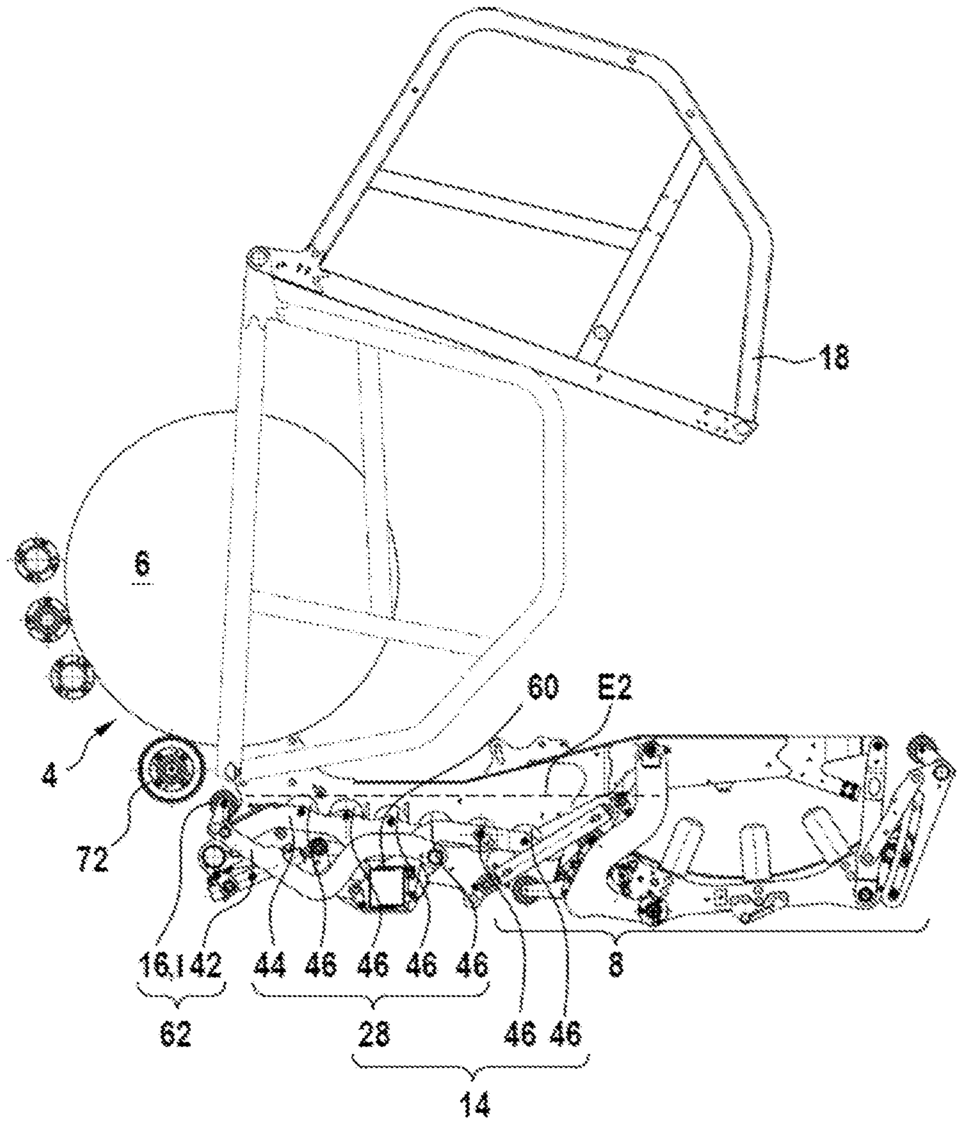
FIG. 2 shows a longitudinal section of a part of the round baler according to the invention with the transfer drive element in a rest position I.

FIG. 2 shows a pressed round bale 6 in the pressing chamber 4. During pressing, the pressing chamber 4 is formed, among other things, by a flap element 18 in a pressing position shown in dashed lines. It is also formed by a starter roller 72. After completion of the round bale 6, the flap element 18 is pivoted into the open position shown in order to discharge the round bale 6 from the pressing chamber 4.

While the flap element 18 is arranged in the pressing position, the transfer drive element 16 is in the rest position I shown in FIG. 2. During the opening process, immediately after the opening of the flap element 18, the transfer drive element is pivoted upward by 10° to 15° into a pick-up support position II (FIG. 3), in which it is located between the starter roller 72 and the transfer segment device 14. In the pick-up support position II, the transfer drive element 16 forms a second part 12*b* of the transfer segment 12.

Figure 4:
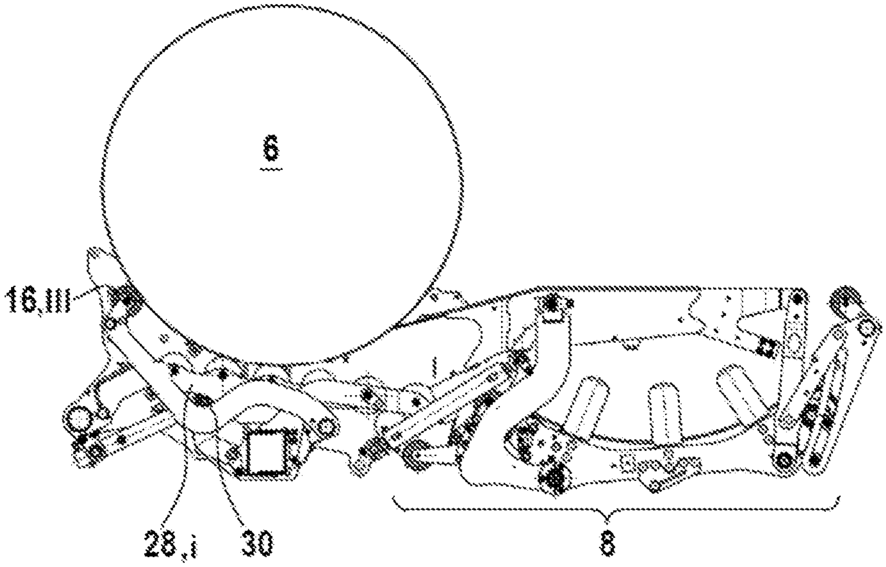
FIG. 4 shows the longitudinal section according to FIG. 3, with the transfer drive element in a contact pick-up position III.
Figure 5:
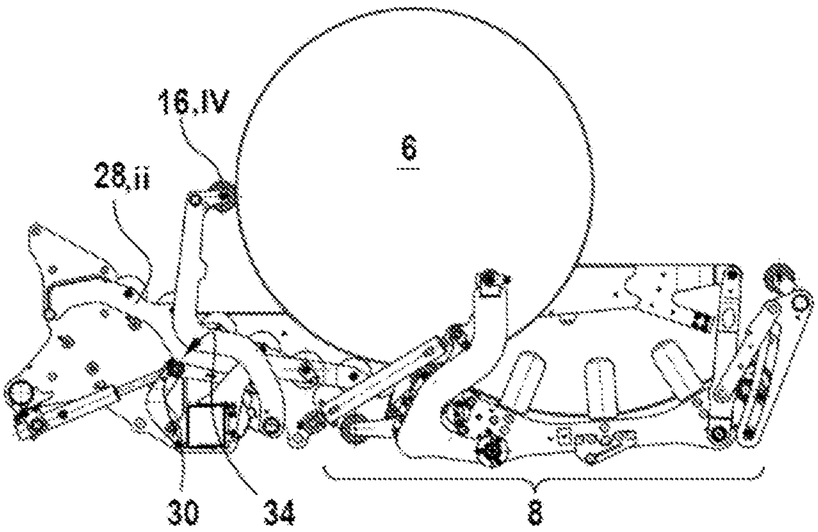
FIG. 5 shows the longitudinal section according to FIG. 3, with the transfer drive element in a first drive position IV.
Figure 6:
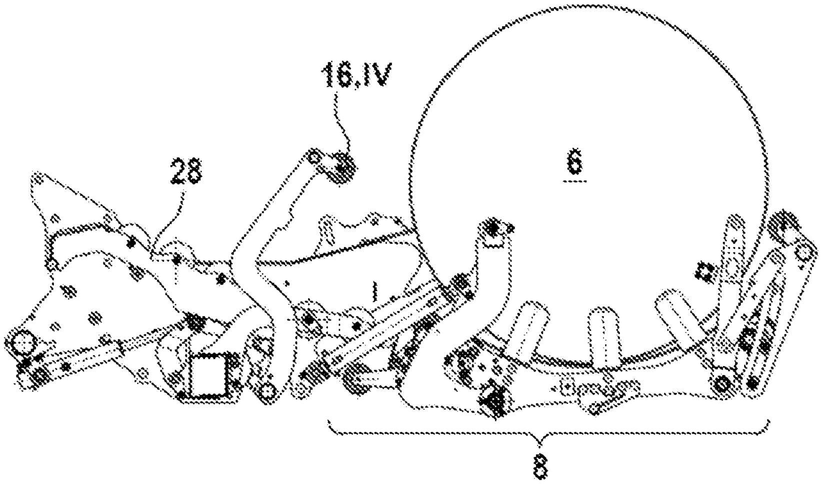
FIG. 6 shows the longitudinal section according to FIG. 3, with the transfer drive element in a second drive position IV.

After the round bale 6 has passed over the transfer drive element 16 in the pick-up support position II, the transfer drive element 16 is pivoted further into a contact pick-up position III (FIG. 4, see below for explanations). In the method shown, it drives the round bale 6 in the transfer direction U. The transfer drive element reaches the contact pick-up position III after pivoting from rest position I by about 18°. In order to drive the round bale 6, the transfer drive element 16 is pivoted further from the contact pick-up position III into a first drive position IV (FIG. 5) and into a second drive position IV (FIG. 6; approx. 95° from rest position I), in which the transfer segment device 14 is arranged between the transfer drive element 16 and the ground contact plane E1. Thereinafter, the transfer of the round bale 6 is completed.

Figure 8:
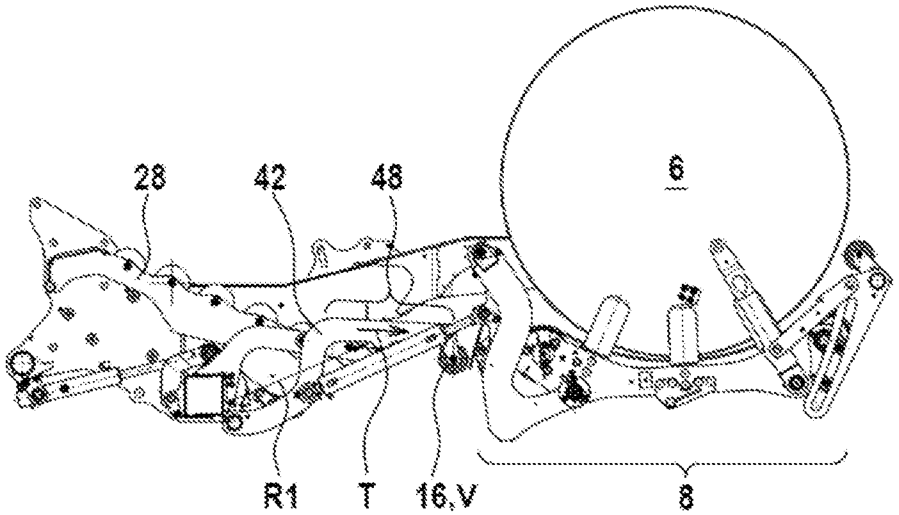
FIG. 8 shows the longitudinal section according to FIG. 7, with the round bale transferred to a wrapping device.

FIG. 7 and FIG. 8 relate to the unintended case whereby a subsequent round bale 6 ends up in the area between the pressing chamber 4 and the transfer drive element 16 in the second drive position IV. For this case, the transfer drive element 16 is further movable from the second drive position IV and movable from the rest position I by almost 180° into the dispensing support position V shown, in which position the frame elements 42 of the transfer drive device 62 form a further part 12*c* of the transfer segment 12 between the first part 12*a* of the transfer segment 12 and the wrapping device 8. For this purpose, a portion 48 of the frame elements 42 is extended in an elongated manner in a portion direction T which, in the dispensing support position V, is less angled to the ground contact plane E1 than a radial R1 related to the drive pivot axis S1 and intersecting the portion 48 (FIG. 8).

Figure 13:
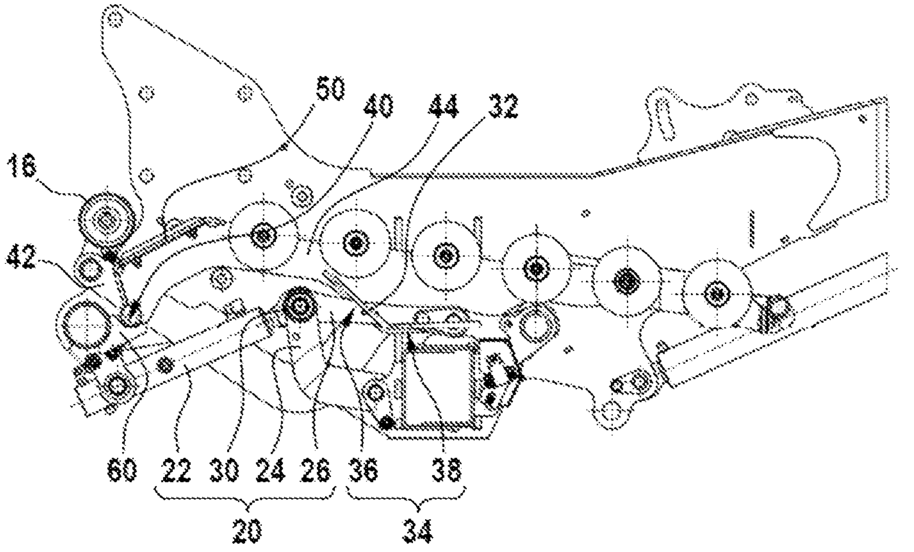
FIG. 13 shows an enlarged partial longitudinal section of the round baler according to the invention.

The transfer device 10 includes two actuating devices 20, each located below one of the transfer segment device units 28. The actuating devices 20 each comprise an actuating element 22 configured as a hydraulic cylinder and a link arrangement between the actuating element 22 and the transfer drive device 62. The link arrangement comprises a first link 24 that is mounted pivotably movable to the actuating element 22 and mounted pivotably movable to the machine chassis 60, and a second link 26 that is mounted pivotably movable to the first link 24 and mounted pivotably movable to the transfer drive device 62 (FIG. 13).

The actuating devices 20 are configured to move both the transfer drive device 62 and the transfer segment device units 28. For this purpose, the actuating devices 20 have transfer elements 30 that cooperate with transfer mating elements 32, included by them, to move the transfer segment device units 28. The transfer mating elements 32 each have a transfer contour 34, which is composed of a first contour section 36 and a second contour section 38 angled relative to the first contour section 36.

Figure 15:
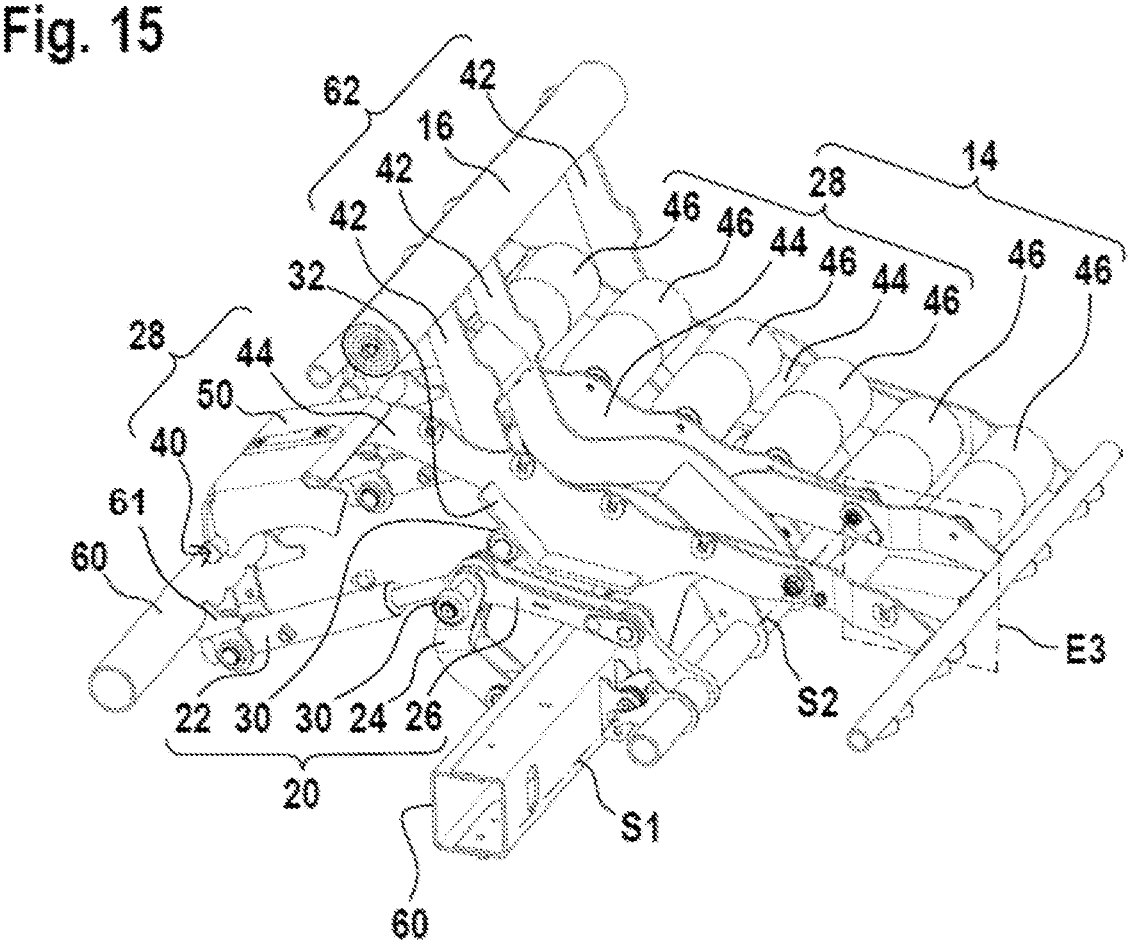
FIG. 15 shows a perspective view of a part of the round baler according to the invention.

The actuating devices 20 are configured in such a way that the transfer elements 30 contact the transfer mating elements 32 in the contact pick-up position III of the transfer drive element 16. When the transfer drive element 16 is pivoted upwards from the contact pick-up position III, the transfer segment device units 28 are lifted from the first position i (amongst others FIG. 4) to the second position ii (amongst others FIG. 5). The transfer mating element 32 is configured in such a way that the movement of the transfer segment device units 28 ends in the second position ii, whereas the transfer drive element 16 is pivoted into the second drive position IV. In so doing, an excessively large gap between the starter roller 72 and the transfer segment device 14 is avoided. In particular, the collection element 50 (FIG. 15), also serves this purpose. When the transfer drive element 16 is between the contact pick-up position III and the rest position I, the transfer segment device units 28 with support surfaces 40 rest detachably on a support element 61 of the machine chassis 60.

The transfer segment device units 28 are arranged mirror-symmetrically to a longitudinal center plane E3, which is arranged in the transfer direction U and at a right angle to the ground contact plane E1. In the top view, according to FIG. 14, it can be seen that two of the four frame elements 42 of the transfer drive device 62 are arranged between the transfer segment device units 28. Step elements 74 are arranged between these two frame elements 42.

Figure 9:
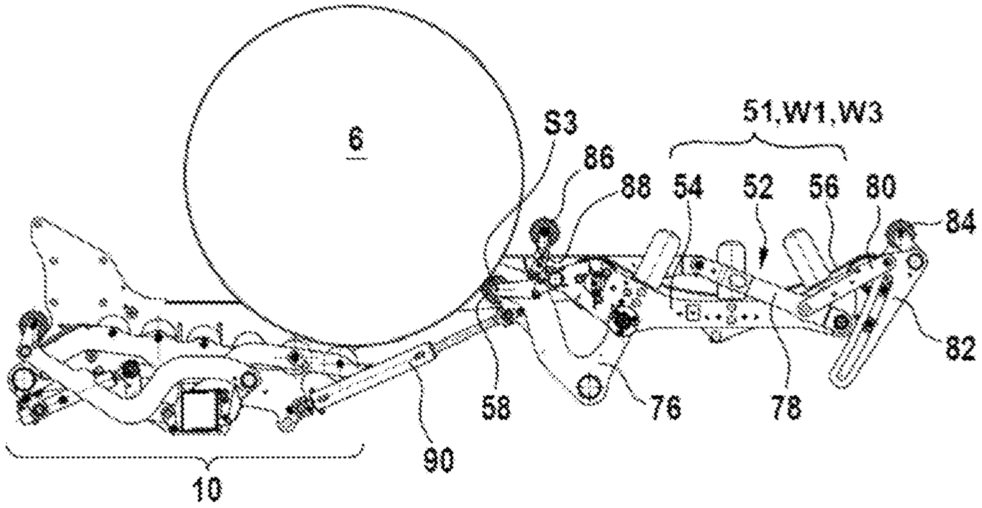
FIG. 9 shows the longitudinal section according to FIG. 3, with a wrapping table of the wrapping device in a bale braking position W1.
Figure 10:
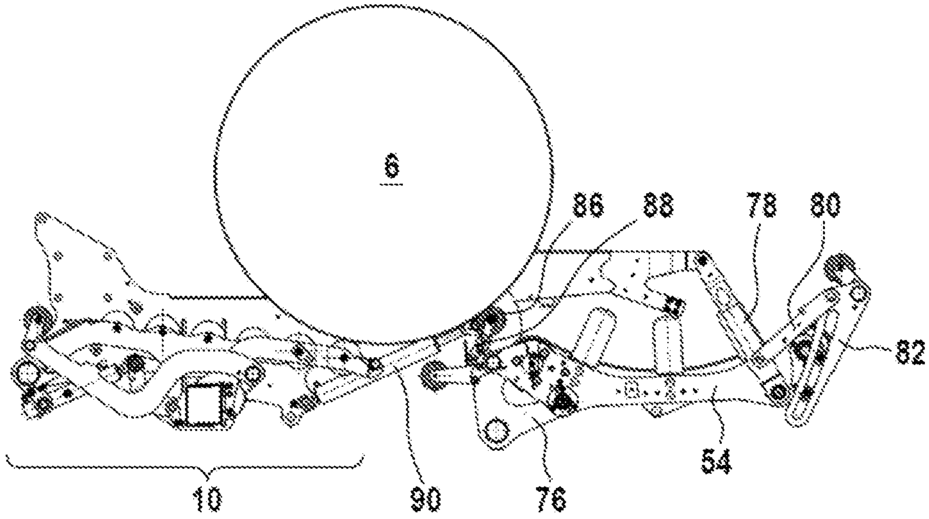
FIG. 10 shows the longitudinal section according to FIG. 3, with the wrapping table between the bale braking position W1 and a pick-up position W2.
Figure 11:
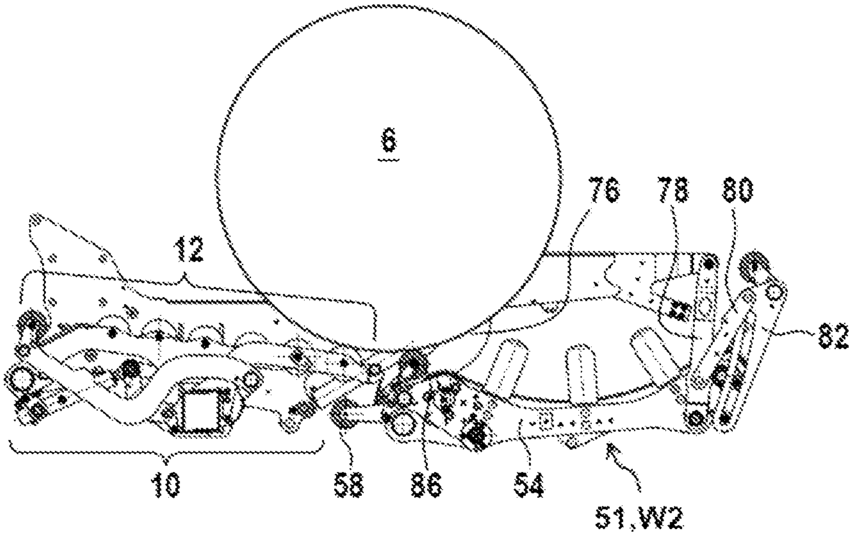
FIG. 11 shows the longitudinal section according to FIG. 3, with the wrapping table in the pick-up position W2.
Figure 12:
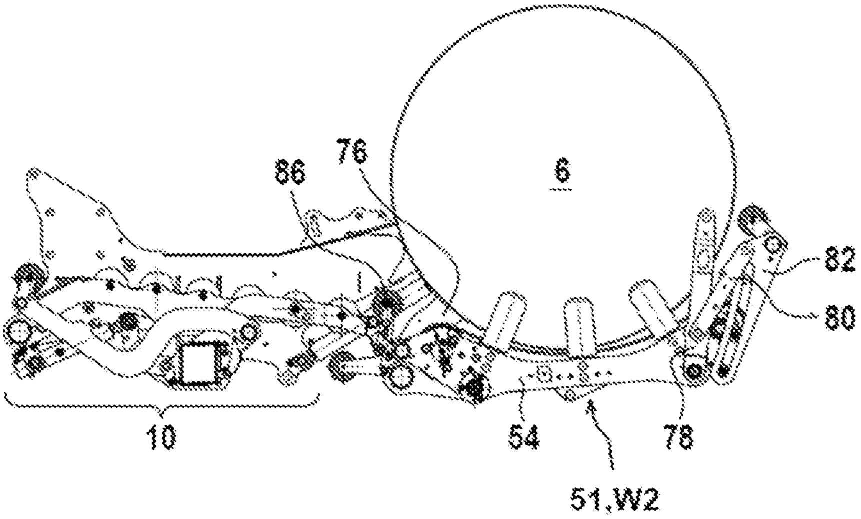
FIG. 12 shows the longitudinal section according to FIG. 11, with the round bale transferred to the wrapping device.

The wrapping device 8 comprises a wrapping table 51 which forms a wrapping trough 52 for the pressed round bale 6 (FIG. 9). The wrapping table 51 moreover comprises a wrapping table frame 54 and four rotating elements 56, which rotate relative to the wrapping table frame 54 during operation (FIG. 14).

The wrapping device 8 further comprises a brake roller element 58 that is rotatably mounted about a rotational axis S3 of the brake roller element that is stationary relative to the wrapping table frame 54 (FIG. 14). The brake roller element 58 is arranged between the wrapping trough 52 and the transfer device 10, at least in the wrapping position W3 of the wrapping table 51 shown in FIG. 9, which is similar to the bale braking position W1. The brake roller element 58 is mounted rotatably about a rotational axis S3 of the brake roller on the wrapping table frame 54 in such a way that the brake roller element 58 is arranged in the pick-up position W2 of the wrapping table 51 shown in FIG. 11, between the transfer segment device 14 and the ground contact plane E1.

For the transfer of the wrapping table 51 from the wrapping position W3 or alternatively bale braking position W1, to the pick-up position W2 and back, the wrapping device 8 comprises a wrapping device actuating element 90 as well as a first wrapping table link 76 and a second wrapping table link 78. On the side facing away from the transfer device 10, a locking device 82 is arranged on the wrapping table frame 54, which locking device is coupled to the second wrapping table link 78 by means of a locking device link 80. The locking device 82 is coupled in such a way that it is arranged in a lowered position relative to the wrapping table frame 54 when the wrapping table 51 is arranged in the wrapping position W3, and is arranged in a raised position when the wrapping table 51 is arranged in the pick-up position W2. A rotatably mounted locking roller element 84 is arranged on the upper side of the locking device 82. On the side of the wrapping table frame 54 facing the transfer device 10, a locking roller element 86 is rotatably mounted on a locking lever 88, which pivots downward in a spring-loaded and yielding manner when the round bale 6 is transferred and is intended to prevent movement of the round bale 6 in a direction contrary to the transfer direction U after a subsequent pivoting backwards.

According to the method portrayed by FIG. 9 to FIG. 12, when the flap element 18 is opened, the wrapping table 51 is in the bale braking position W1 spaced apart from the transfer device 10. After the round bale 6 has made contact with the brake roller element 58, the wrapping table 51 is moved to the pick-up position W2 and the round bale 6 turns up on the wrapping table 51 due to gravity. In this, the locking device 82 prevents the round bale 6 from rolling out of the wrapping table 51, even during upward travel. The wrapping table 51 is subsequently moved to the wrapping position W3 to wrap the round bale 6.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
|---|---|
| 2 | Round baler |
| 4 | Pressing chamber |
| 6 | Round bale |
| 8 | Wrapping device |
| 10 | Transfer device |
| 12 | Transfer segment |
| 12a | First part of transfer segment |
| 12b | Second part of transfer segment |
| 12c | Further part of transfer segment |
| 14 | Transfer segment device |
| 16 | Transfer drive element |
| 18 | Flap element |
| 20 | Actuating devices |
| 22 | Acuating element |
| 24 | First link |
| 26 | Second link |
| 28 | Transfer segment device unit |
| 30 | Transfer elements |
| 32 | Transfer mating elements |
| 34 | Transfer contour |
| 36 | First contour section |
| 38 | Second contour section |
| 40 | Support surfaces |
| 42 | Four frame elements |
| 44 | Two frame elements |
| 46 | Roller elements |
| 48 | Portion of the frame elements |

TABLE 1-continued

| List of Reference Characters | |
|---|---|
| 50 | Collection element |
| 51 | Wrapping table |
| 52 | Wrapping trough |
| 54 | Wrapping table frame |
| 56 | Four rotating elements |
| 58 | Brake roller element |
| 60 | Machine chassis |
| 62 | Transfer drive device |
| 70 | Tractor unit |
| 72 | Starter roller |
| 76 | First wrapping table link |
| 78 | Second wrapping table link |
| 80 | Locking device link |
| 82 | Locking device |
| 84 | Rotatably mounted locking roller element |
| 86 | Locking roller element |
| 88 | Locking lever |
| 90 | Wrapping device actuating element |
| i | First position |
| tt | Second position |
| I | Rest position |
| II | Pick-up support position |
| III | Contact pick-up position |
| IV | First drive position/second drive position |
| V | Dispensing support position |
| E1 | Ground contact plane |
| E2 | Reference plane |
| E3 | Longitudinal center plane |
| R1 | Radial |
| S1 | Drive pivot access |
| S2 | Pivot axis |
| S3 | Rotational axis |
| T | Portion direction |
| U | Transfer direction |
| W1 | Bale braking position |
| W2 | Pick-up position |
| W3 | Wrapping position |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A round baler (2) for harvested agricultural material, comprising of:

a pressing chamber (4) for pressing a round bale (6), wherein the pressing chamber (4) includes a wrapping device (8) for wrapping the pressed round bale (6) with a sheathing material and comprising a transfer device (10), which is configured to form a transfer segment (12), via which the pressed round bale (6) can be transferred in a transfer direction (U) from the pressing chamber (4) to the wrapping device (8); and at least one transfer segment device (14), which, at least in a first position, forms at least a predominant first part (12*a*) of the transfer segment (12), wherein the transfer device (10) includes a transfer drive element (16) which, to drive the pressed round bale (6) to the wrapping device (8), is mounted movably relative to the transfer segment device (14) at least partially in the transfer direction (U) in at least one drive position (IV), in which position the transfer segment device (14) is arranged at least partially between the transfer drive element (16) and a ground contact plane (E1) of the round baler (2);

wherein the transfer device (10) includes an at least one actuating device (20) with an actuating element (22) for moving the transfer drive element (16) at least into the drive position (IV);

wherein the at least one transfer segment device (14) includes at least one transfer segment device unit (28), which is pivotably movable relative to a machine chassis (60) of the round baler (2) about a pivot axis (S2) for the segment, from a first position (i), in which the transfer segment device unit (28) is arranged when the transfer segment device (14) is arranged in the first position, into a second position (ii);

wherein the at least one actuating device (20) includes at least one transfer element (30) by means of which the at least one actuating device (20) is configured to move the transfer segment device unit (28) from the first position (i) to the second position (ii); and wherein the transfer drive element (16) is mounted at least partially pivotably movable about a drive pivot axis (S1).

2. The round baler according to claim 1, wherein the transfer drive element (16) is movably mounted at least in a pick-up support position (II), in which the transfer drive element (16) forms a second part (12*b*) of the transfer segment (12).

3. The round baler according to claim 2, wherein the transfer drive element (16) is mounted in such a way that the second part (12*b*) of the transfer segment (12) is arranged between the pressing chamber (4) and the first part (12*a*) of the transfer segment (12).

4. The round baler according to claim 1, wherein the transfer drive element (16) in a pick-up support position extends in a spatial section which is stationary relative to the pressing chamber (4) and into which a flap element (18) of the round baler (2) extends in a pressing position in which the flap element (18) cooperates to form the pressing chamber (4).

5. The round baler according to claim 1, wherein the drive pivot axis (S1) is arranged in an intermediate space between the ground contact plane (E1) and a reference plane (E2) that is parallel to the ground contact plane (E1) and adjacent to the transfer segment device (14), in which the transfer segment device (14) is also arranged.

6. The round baler according to claim 1, wherein the transfer drive element (16) is movably mounted at least in a dispensing support position (V), in which a transfer drive device (62) comprising the transfer drive element (16) and, in particular, mounted pivotably movable with the transfer drive element (16) about the drive pivot axis (S1) forms a further part (12*c*) of the transfer segment (12), which further part is arranged between the first part (12*a*) and the wrapping device (8).

7. The round baler according to claim 1, wherein the at least one actuating device (20) is configured to pivot the transfer drive element (16) by at least 15°, by at least 120°, or by at least 160°.

8. The round baler according to claim 1, wherein the at least one actuating element (22), in at least one position (IV) of the transfer drive element (16) and in the first position of the transfer segment device (14), is at least partially arranged between the transfer segment device (14) and the ground contact plane (E1).

9. The round baler according to claim 1, wherein the at least one actuating device (20) includes a link arrangement that couples the actuating element (22) to the transfer drive element (16), the link assembly comprising a first link (24) that is mounted pivotably movable to the actuating element (22) and pivotably movable to a machine chassis (60) of the round baler (2), and a second link (26) that is mounted pivotably movable to the first link (24) and pivotably movable to the transfer drive element (16).

10. The round baler according to claim 1, wherein the at least one transfer segment device unit (28) comprises a support surface (40) spaced apart from the pivot axis (S2) for the segment, which support surface is configured in such a way that the transfer segment device unit (28), at least in the first position (i), releasably contacts the support surface (40) on a support element (61) of the machine chassis (60).

11. The round baler according to claim 1, wherein the actuating device (20) is configured in such a way that during a movement of the transfer drive element (16) from a pick-up support position (II) to the drive position (IV), the transfer element (30) contacts a transfer mating element (32) of the transfer segment device unit (28).

12. The round baler according to claim 11, wherein the transfer element (30) and/or the transfer mating element (32) are/is shaped in such a way that the movement of the transfer segment device unit (28) from the first position (i) ends in the second position (ii), whereas the transfer drive element (16) is moved from the pick-up support position (II) to the drive position (IV).

13. The round baler according to claim 11, wherein the transfer mating element (32) includes a transfer contour (34) in longitudinal section, which comprises a first contour section (36), in particular a straight contour section, and a second contour section (38), in particular a straight contour section which is angled with respect to the first contour section (36).

14. The round baler according to claim 1, wherein the at least one transfer segment device (14) comprises at least two transfer segment device units (28), which units are respectively spaced apart from a longitudinal center plane (E3) perpendicular to the ground contact plane (E1) and parallel to the transfer direction (U), which extends between the transfer segment device units (28), and which are formed, in particular, mirror-symmetrically to the longitudinal center plane (E3).

15. The round baler according to claim 1, further comprising a transfer drive device (62) that includes the transfer drive element (16) and/or the at least one transfer segment device unit (28) includes at least one frame element (42, 44) and, in particular, at least one roller element (46) rotatably mounted on the frame element (42, 44).

16. The round baler according to claim 15, wherein the at least one frame element (42, 44) of the transfer drive device (62) is arranged at least in the pick-up support position (II) of the transfer drive element (16) in a top view at least partially between the two transfer segment device units (28).

17. The round baler according to claim 15, wherein a portion (48) of the at least one frame element (42) of the transfer drive device (62) that is spaced apart from the drive pivot axis (S1) extends in an elongate manner in a portion direction (T) which, in the dispensing support position (V) of the transfer drive element (16), is less strongly angled to the ground contact plane (E1) than a radial line (R1) with respect to the drive pivot axis (S1) and which radial line intersects the portion (48).

18. The round baler according to claim 1, wherein an end of the transfer segment device unit (28) facing away from the pivot axis (S2) for the segment is formed by a collection element (50) which is arranged between the transfer drive element (16) and the ground contact plane (E1) at least in the first position of the transfer segment device (14) and when the transfer drive element (16) is arranged in the pick-up support position (II).

19. The round baler according to claim 1, wherein the wrapping device (8) comprises a wrapping table (51) forming a wrapping trough (52) for the pressed round bale (6) and comprises a wrapping table frame (54), wherein the wrapping device (8) comprises a brake roller element (58) that is rotatably mounted about a rotational axis (S3) of the brake roller that is, in particular, stationary relative to the wrapping table frame (54), and which is arranged between the wrapping trough (52) and the transfer device (10) at least in a wrapping position (W3) of the wrapping table (51).

20. The round baler according to claim 19, wherein the brake roller element (58) is mounted on the wrapping table frame (54) in such a way that the brake roller element (58) in a pick-up position (W2) of the wrapping table (51) is arranged between at least a part of the transfer segment device (14) and the ground contact plane (E1).

21. A method for operating a round baler (2) as disclosed in claim 1, comprising:

- transferring a pressed round bale (6) from the pressing chamber (4) that is to be opened by a flap element (18) towards the transfer device (10), into the wrapping device (8), which comprises a wrapping table (51) that is movable from a wrapping position (W3) into a/the pick-up position (W2) on the transfer segment (12) and forms a/the wrapping trough (52) for the pressed round bale (6);
- braking the pressed round bale (6) when the wrapping table (51) is moved into a bale braking position (W1) and/or is held in the bale braking position (W1), which corresponds to the wrapping position (W3) or in which the wrapping table (51) is arranged between the wrapping position (W3) and the pick-up position (W2);
- opening the pressing chamber (4) with the flap element (18), subsequently, to discharge the pressed round bale (6) from the pressing chamber (4) to the transfer device (10);
- moving the wrapping table (51) to the pick-up position (W2), subsequently, for picking up of the pressed round bale (6), and subsequently, and
- moving the wrapping table (51) to the wrapping position (W2), subsequently, to wrap the picked up round bale (6).

22. The method according to claim 21, wherein the movement of the wrapping table (51) into the pick-up position (W2) takes place after a certain period of time has elapsed after the opening of the flap element (18) and/or as a function of an output signal from a bale brake sensor for detecting a round bale (6) being in contact with the wrapping device (8), in particular with the brake roller element (58).

23. The method according to claim 21, wherein the bale braking position (W1) is set as a function of the size of the pressed round bale (6).

24. The method according to claim 21, wherein the movement of the wrapping table (51), in particular the determination of the duration or the setting of the bale braking position (W1), is dependent on an inclination of the round baler (2).

25. A process for utilizing a round baler (2) for harvested agricultural material, comprising of:

- operating a pressing chamber (4) for pressing a round bale (6), wherein the pressing chamber (4) includes a wrapping device (8) for wrapping the pressed round bale (6) with a sheathing material and comprising a transfer device (10), which is configured to form a transfer segment (12), via which the pressed round bale (6) can be transferred in a transfer direction (U) from the pressing chamber (4) to the wrapping device (8);
- driving the pressed round bale (6) to the wrapping device (8) with at least one transfer segment device (14), which, at least in a first position, forms at least a predominant first part (12*a*) of the transfer part (12), wherein the transfer device (10) includes a transfer drive element (16) that is mounted movably relative to the transfer segment device (14) at least partially in the transfer direction (U) in at least one drive position (IV), in which position the transfer segment device (14) is arranged at least partially between the transfer drive element (16) and a ground contact plane (E1) of the round baler (2); and
- utilizing a control device to automatically provide the following functions that include a transfer for a pressed round bale (6) from the pressing chamber (4) that is to be opened by a flap element (18) towards the transfer device (10), into the wrapping device (8), which includes a wrapping table (51) that is movable from a wrapping position (W3) into a pick-up position (W2) on the transfer segment (12) and forms a wrapping trough (52) for the pressed round bale (6), provide braking of the pressed round bale (6), with the wrapping table (51) is moved into a bale braking position (W1) and/or is held in the bale braking position (W1) which corresponds to the wrapping position (W3) or in which the wrapping table (51) is arranged between the wrapping position (W3) and the pick-up position (W2) and then having the flap element (18) open the pressing chamber (4) to discharge the pressed round bale (6) from the pressing chamber (4) to the transfer device (10), and then having the wrapping table (51) moved to the pick-up position (W2) for picking up of the pressed round bale (6), and then having the wrapping table (51) move to the wrapping position (W2) to wrap the picked up round bale (6);

wherein the transfer device (10) includes an at least one actuating device (20) with an actuating element (22) for moving the transfer drive element (16) at least into the drive position (IV);

wherein the at least one transfer segment device (14) includes at least one transfer segment device unit (28), which is pivotably movable relative to a machine chassis (60) of the round baler (2) about a pivot axis (S2) for the segment, from a first position (i), in which the transfer segment device unit (28) is arranged when the transfer segment device (14) is arranged in the first position, into a second position (ii);

wherein the at least one actuating device (20) includes at least one transfer element (30) by means of which the at least one actuating device (20) is configured to move the transfer segment device unit (28) from the first position (i) to the second position (ii); and wherein the transfer drive element (16) is mounted at least partially pivotably movable about a drive pivot axis (S1).

* * * * *